Patented Apr. 29, 1952

2,594,488

UNITED STATES PATENT OFFICE 2,594,488

PLASTICIZED POLYVINYL CHLORIDE COMPOSITIONS

Tracy M. Patrick, Jr., Dayton, Ohio, assignor to Monsanto Chemical Company, St. Louis, Mo., a corporation of Delaware No Drawing. Application December 29, 1949, Serial No. 135,830

16 Claims. (Cl. 260—31.8)

This invention relates to new plastic compositions comprising vinyl chloride and an acyl derivative of an alkyl ester of a 4 to 6 carbon atom unsaturated polycarboxylic acid, as for example ketosuccinates and ketotricarballylates.

Compositions based on polyvinyl chloride are among the most widely used plastic materials currently available. Polyvinyl chloride per se however is a hard, horny, brittle material which has little utility. This material is modified by the incorporation of a plasticizer to provide a large range of compositions of varying physical properties.

Vinyl chloride may be copolymerized with other monomers, as for example a small amount of vinyl acetate to also materially improve the general physical properties of the vinyl chloride resin. Copolymers of this nature, wherein the vinyl chloride is the major resin constituent, may also be further modified by the incorporation of a plasticizer. Thus, by "vinyl chloride" resin is meant polyvinyl chloride and copolymers of vinyl chloride wherein the vinyl chloride comprises at least about 80 percent by weight of the resin composition.

Many plasticizers have been recommended and are used for formulation with vinyl chloride resins. However, for various reasons none of the plasticizers available provide the optimum conditions for all physical properties. Currently the most widely used general polyvinyl chloride plasticizers are tricresyl phosphate and di-2-ethylhexyl phthalate.

Recently cresylic acid and phthalic anhydride were in short supply and plasticizers became the bottleneck of the plastics industry. This condition has now been alleviated but it points out the necessity of having a large range of suitable plasticizers available from varying sources. This would be desirable even if the new plasticizers might be somewhat inferior in certain physical properties to the currently favored plasticizers. It is of course understood that the ultimate end use of the vinyl chloride plastic will determine the essential physical properties required. Thus, for many specialty applications certain specific properties may be ignored, if unimportant for the intended application.

The object of this invention is to provide plasticized vinyl chloride compositions wherein the plasticizer is economical, compatible with the vinyl chloride composition over a wide range of proportions, and is effective over a wide range of temperature variations. Other objects will be apparent from the following disclosure.

It has now been found that compositions of polyvinyl chloride with the acyl derivatives of 4 to 6 carbon atom unsaturated polycarboxylic acid alkyl esters provide resins which have chemical and physical characteristics which are comparable to the best general plasticizers currently employed. In general the acyl radicals and the ester alkyl radicals may range from about 1 to 12 carbon atoms, inclusive. Where all of the alkyl and acyl radicals are large the material is in general incompatible with polyvinyl chloride resins. Where all of the alkyl and acyl radicals are small the ester-ketone is in general too volatile for normal use. Thus, the alkyl and acyl radicals should be chosen such that the ketone-ester plasticizer has a molecular weight of from about 350 to 500 and preferably from about 400 to 450. The ester alkyl radicals may be mixed or identical providing the aforementioned molecular weight limitations are realized.

The ketone esters may in general be identified by the structural formula:

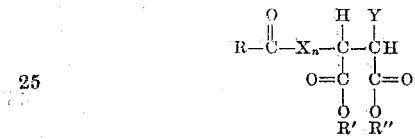

wherein X is

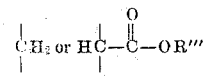

and $n$ is 0 or 1; Y is H or $CH_3$; R is an alkyl radical of 1 to 11 carbon atoms; and R', R'', and R''' are alkyl radicals of 1 to 12 carbon atoms.

The ketone-ester plasticizer as above identified may in general be employed from about 5 up to about 45 percent by weight of the final composition and preferably from about 20 to about 45 percent. The polyvinyl chloride composition also nearly always has a stabilizer to protect the resin from thermal decomposition and degradation of color. In addition, fillers, coloring materials, and mold lubricants may be added as is well-known to those familiar with the art.

Mixed plasticizers may also be employed from among the above disclosed ketone-esters and suitable prior art plasticizers.

The following examples are illustrative of this invention:

*Example 1*

A 136-g. sample (0.4 mole) of di-2-ethylhexyl maleate and 86.4 g. (1.2 moles) of redistilled butanal were added to a 500 ml., round-bottomed flask fitted with a reflux condenser, and a thermometer. The flask was supported by an electric heating mantle. The ester-aldehyde mixture was brought to reflux at 86° C. and 0.5 g. of benzoyl peroxide added thereto. After 18 hours the reflux temperature had risen to 95° C. at which time the reaction was terminated, the mixture being a clear, very pale orange liquid. The desired product was recovered by fractional distillation, was a pale yellow liquid and a yield of 84 percent was obtained. The product was identified as di-2-ethylhexyl butyrylsuccinate.

The di - 2 - ethylhexyl butyrylsuccinate was milled into a standard polyvinyl chloride composition in an amount sufficient to provide 40 percent plasticizer on the basis of the total composition and evaluated as shown in the table.

Example 2

An 85.5-g. sample (0.25 mole) of tributyl aconitate and 75 g. (1.04 moles) of redistilled butanal were added to a 500 ml. flask equipped as in Example 1. The mixture was brought to reflux at about 83.8° C., then 0.5 g. of benzoyl peroxide was added thereto. An additional 0.2 g. of benzoyl peroxide was added after refluxing for about 4.5 hours; the refluxing was continued for an additional 3 hours after which time the temperature was 89.2° C. and the reaction was terminated. The desired product was recovered by fractional distillation and was a medium yellow liquid. The yield was 99 percent. The product was identified as tributyl α-butyryltricarballylate.

The tributyl α-butyryltricarballylate was milled into a standard polyvinyl chloride composition in an amount sufficient to provide 40 percent plasticizer on the basis of the total composition and evaluated as shown in the table.

Example 3

A 142-g. sample (0.5 mole) of dihexyl maleate was added to a 500 ml. round-bottomed flask and 108 g. (1.5 moles) of redistilled butanal was added thereto. The flask was equipped as in Example 1. The mixture of ester and aldehyde was then brought to reflux at 86° C. and 1 g. of benzoyl peroxide was added. After 24 hours the reflux temperature was 96° C. at which time the heating was discontinued and the reaction mixture allowed to cool. The pale yellow liquid reaction mixture was then extracted with about 100 ml. of a saturated sodium bicarbonate solution, washed twice with about 100 ml. of water, anhydrous sodium sulphate added thereto to remove the residual water, filtered and purified by fractional distillation. An 85 percent yield of a pale yellow liquid was obtained. The product was identified as dihexyl butyrylsuccinate.

The dihexyl butyrylsuccinate was milled into a standard polyvinyl chloride composition in an amount sufficient to provide 40 percent plasticizer on the basis of the total composition and evaluated as shown in the table.

|  | TCP | DOP | Ex. 1 | Ex. 2 | Ex. 3 |
|---|---|---|---|---|---|
| Low Temp. Flexibility, ° C.[1] | −10 | −36 | −46 | −34 | −50 |
| Shore Durometer Hardness "A" | 78 | 74 | 72 | 70 | 71 |
| Volatility 24 hrs. at 105° C. | 0.8 | 4.5 | 7.1 | 6.8 | 22 |
| Per Cent Water Absorption 24 hrs. | 0.32 | 0.14 | 0.30 | 0.42 | 0.35 |
| Per Cent Water Leaching Loss 24 hrs. | 0.01 | 0.02 | 0.03 | 0.05 | 0.09 |

TCP = tricresyl phosphate.
DOP = di-2-ethylhexyl phthalate.
Ex. 1 = di-2-ethylhexyl butyrylsuccinate.
Ex. 2 = tributyl α-butyryltricarballylate.
Ex. 3 = dihexyl butyrylsuccinate.
[1] Clash and Berg method.

The ketone-ester plasticizers of the above examples did not require excessive milling times or temperatures, did not exhibit any disagreeable fuming when properly stabilized and had good heat stability without discoloration to an excessive degree.

Other suitable ketone-esters which may be compounded with vinyl chloride resins are for example, di - 2 - ethylhexyl heptanoylsuccinate, tributyl 2-ethylhexanoyltricarballylate, tributyl α-heptanoyltricarballylate, triamyl α-butyryltricarballylate.

The novel process of producing the ketone-esters is disclosed and claimed in the copending application of Tracy M. Patrick, Jr. and Earl W. Gluesenkamp, filed December 29, 1949, as Serial No. 135,829.

I claim:

1. A plasticized vinyl chloride resin which comprises a polymer of vinyl chloride containing intimately dispersed therein a compound having the general ketone-ester formula:

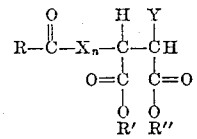

wherein X is selected from the group consisting of

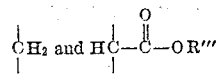

and $n$ is an integer from 0 to 1, inclusive; Y is selected from the group consisting of H and $CH_3$; R is an alkyl radical of 1 to 11 carbon atoms; R', R'', and R''' are alkyl radicals of 1 to 12 carbon atoms; and the molecular weight of said ketone-ester is from about 350 to about 500.

2. The plasticized vinyl chloride resin composition of claim 1 wherein the ketone-ester comprises from about 20 to about 45 percent by weight of the total composition.

3. A plasticized vinyl chloride resin which comprises a polymer of vinyl chloride containing intimately dispersed therein di-2-ethylhexyl butyrylsuccinate.

4. The plasticized vinyl chloride resin composition of claim 3 wherein the di-2-ethylhexyl butyrylsuccinate comprises from about 20 to about 45 percent by weight of the total composition.

5. A plasticized vinyl chloride resin which comprises a polymer of vinyl chloride containing intimately dispersed therein tributyl α-butyryltricarballylate.

6. The plasticized vinyl chloride resin composition of claim 5 wherein the tributyl α-butyryltricarballylate comprises from about 20 to about 45 percent by weight of the total composition.

7. A plasticized vinyl chloride resin which comprises a polymer of vinyl chloride containing intimately dispersed therein di - 2 - ethylhexyl heptanoylsuccinate.

8. The plasticized vinyl chloride resin composition of claim 7 wherein the di-2-ethylhexyl heptanoylsuccinate comprises from about 20 to about 45 percent by weight of the total composition.

9. A plasticized vinyl chloride resin which comprises a polymer of vinyl chloride containing intimately dispersed therein tributyl α-heptanoyltricarballylate.

10. The plasticized vinyl chloride resin composition of claim 9 wherein the tributyl α-heptanoyl-tricarballylate comprises from about 20 to about 45 percent by weight of the total composition.

11. A plasticized vinyl chloride resin which comprises a polymer of vinyl chloride containing intimately dispersed therein triamyl α-butyryl-tricarballylate.

12. The plasticized vinyl chloride resin composition of claim 11 wherein the triamyl α-butyryl-tricarballylate comprises from about 20 to about 45 percent by weight of the total composition.

13. A plasticized vinyl chloride resin which comprises a polymer of vinyl chloride containing intimately dispersed therein a compound having the general ketone-ester formula:

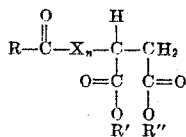

wherein X is

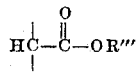

and $n$ is an integer from 0 to 1, inclusive; R is an alkyl radical of 1 to 11 carbon atoms; R', R'', and R''' are alkyl radicals of 1 to 12 carbon atoms; and the molecular weight of said ketone-ester is from about 350 to about 500.

14. The plasticized vinyl chloride resin composition of claim 13 wherein the ketone-ester comprises from about 20 to about 45 percent by weight of the total composition.

15. A plasticized vinyl chloride resin which comprises a polymer of vinyl chloride containing intimately dispersed therein a compound having the general ketone-ester formula:

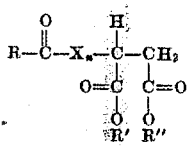

wherein X is

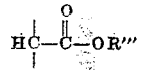

and $n$ is an integer from 0 to 1, inclusive; R is an alkyl radical of 1 to 11 carbon atoms, R', R'', and R''' are alkyl radicals of 1 to 12 carbon atoms; and the molecular weight of said ketone-ester is from about 400 to about 450.

16. The plasticized vinyl chloride resin composition of claim 15 wherein the ketone-ester comprises from about 20 to about 45 percent by weight of the total composition.

TRACY M. PATRICK, JR.

REFERENCES CITED

The following references are of record in the file of this patent:

UNITED STATES PATENTS

| Number | Name | Date |
| --- | --- | --- |
| 1,845,751 | Jaeger | Feb. 16, 1932 |
| 2,438,961 | Boese | Apr. 6, 1948 |